Feb. 2, 1943. G. M. GIBBS ET AL 2,309,947
AMPHIBIOUS ARMORED VEHICLE
Filed June 23, 1941 4 Sheets-Sheet 3
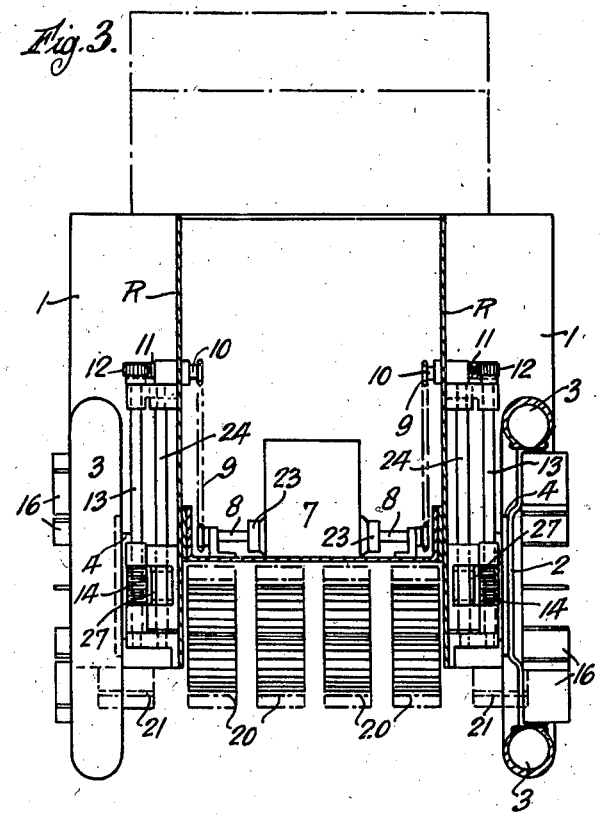
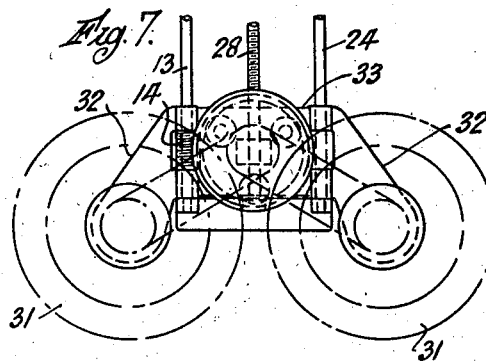

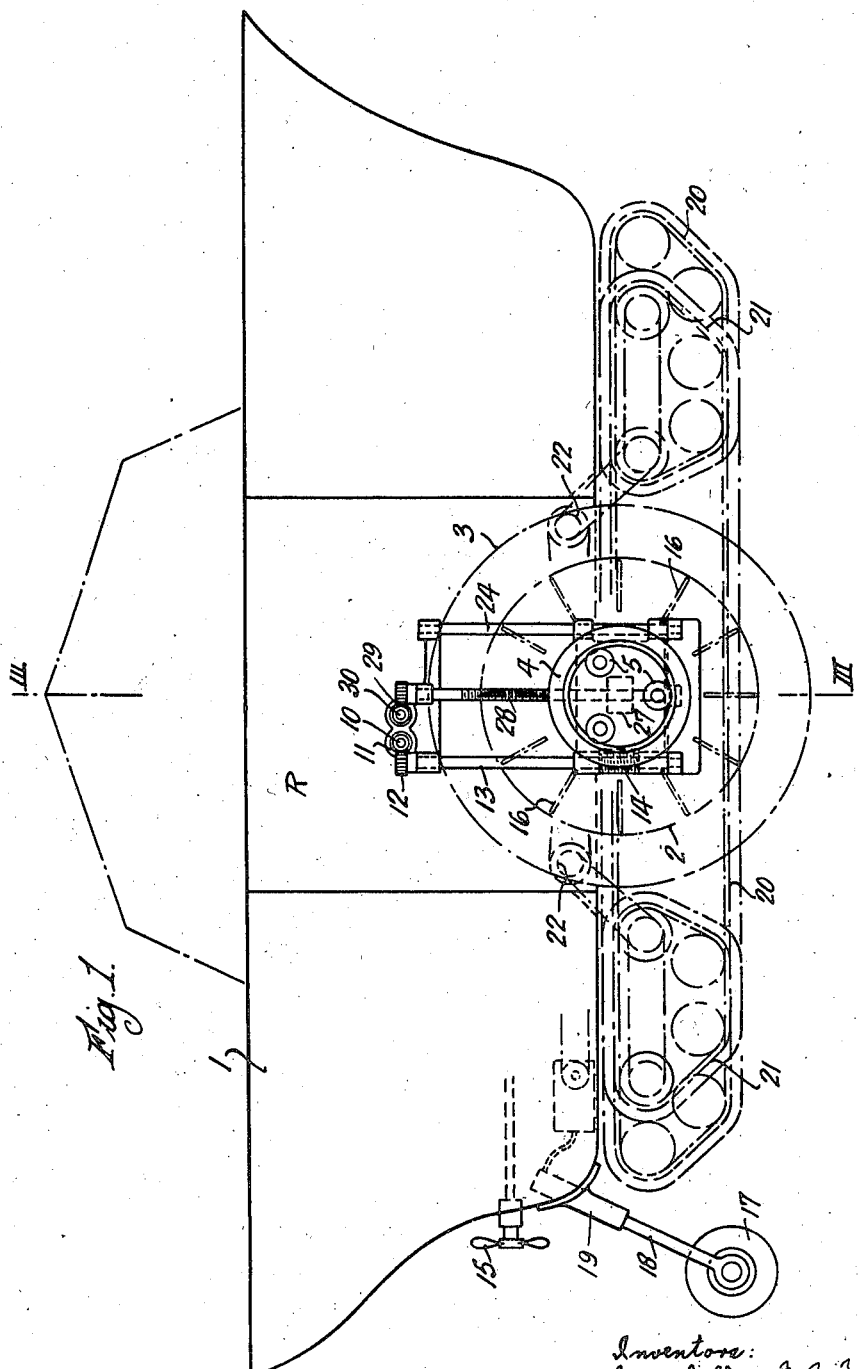

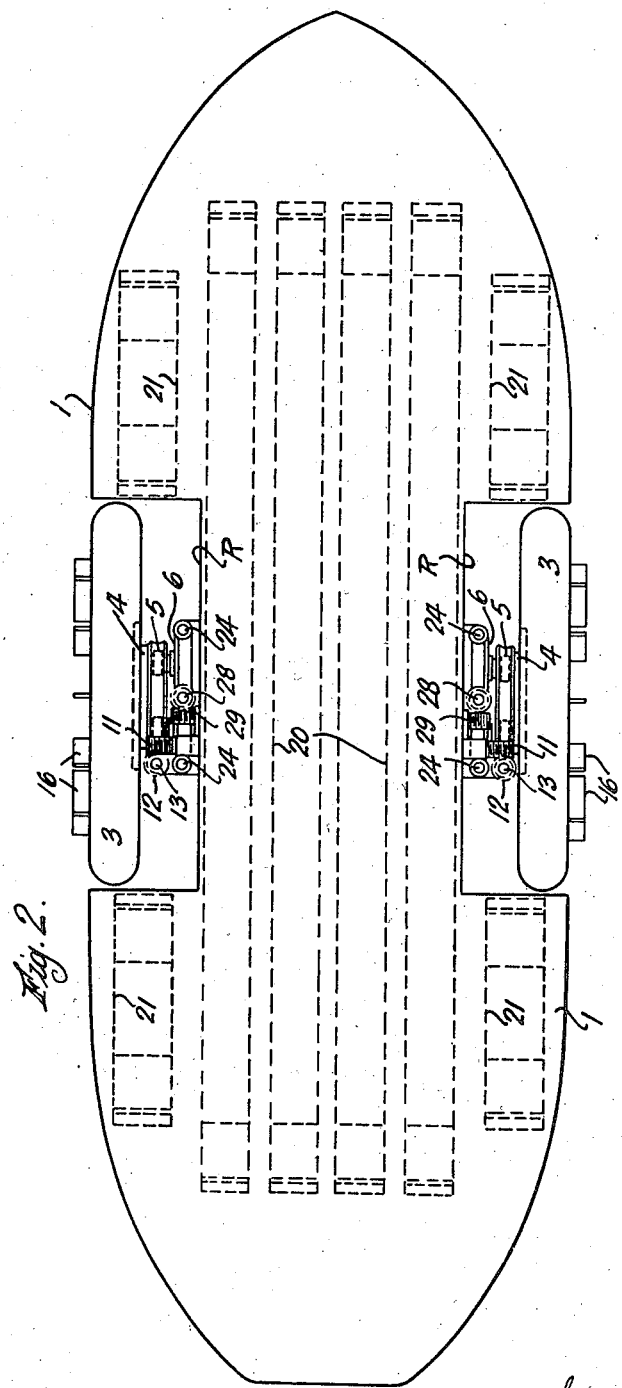

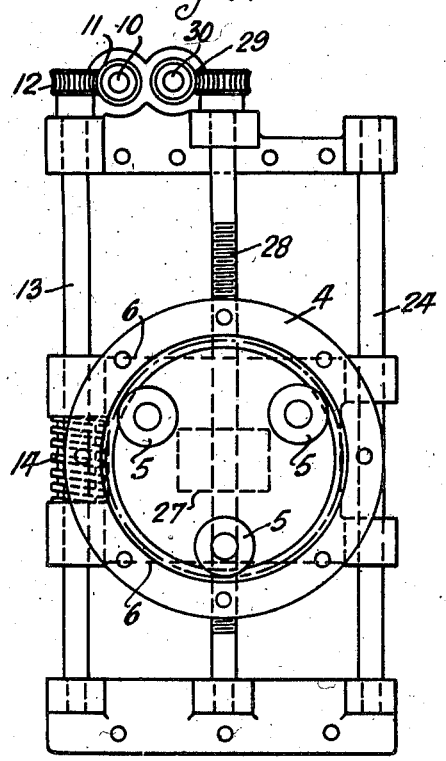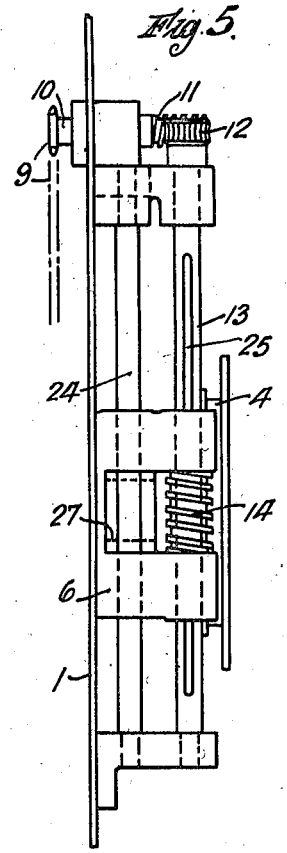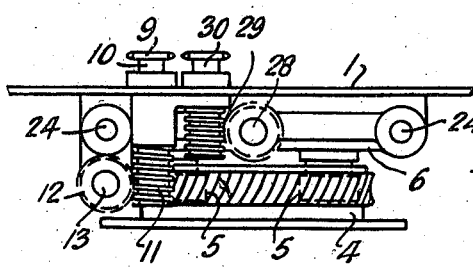

Patented Feb. 2, 1943

2,309,947

UNITED STATES PATENT OFFICE 2,309,947

AMPHIBIOUS ARMORED VEHICLE

Geoffrey Maxwell Gibbs and Thomas Rawson Tusting, London, England

Application June 23, 1941, Serial No. 399,352
In Great Britain July 13, 1940

2 Claims. (Cl. 115—1)

This invention relates to amphibious vehicles for use in land and water operations whether for war purposes or commercial purposes.

According to one feature of the present invention an amphibian vehicle comprises in combination a buoyant body, a power unit carried by the body, an endless track arrangement to propel the vehicle over relatively soft ground, means to connect the track to the body at a fixed height, propelling wheels to propel the vehicle over relatively hard ground, means associated with said propelling wheels for propelling said vehicle through water, frames connecting the wheels to the body, a pair of vertical screws journalled on the body, nuts carried by the frames and respectively engaging said screws, means for transmitting drive from said power unit to said screws for raising and lowering said frames to alter the positions of the wheels in relation to the endless track arrangement to bring either the wheels or the endless track arrangement into propelling position, and means to transmit drive from the power unit to the endless track arrangement and to the propelling wheels.

According to a further feature of the invention, an amphibian vehicle comprises in combination a buoyant body, a power unit carried by the body, an endless track arrangement to propel the vehicle over relatively soft ground, means to connect the track to the body at a fixed height, propelling wheels to propel the vehicle over relatively hard ground, means associated with said propelling wheels for propelling said vehicle through water, frames connecting the wheels to the body, means mounting the frames for vertical movement on said body, worm wheels carried respectively by said propelling wheels, vertically extending splined shafts journalled on said body and having combined rotary and vertical sliding movements relative to said frames respectively, worms spline-connected to said shafts respectively to turn therewith and to slide relatively thereto, said worms meshing with said worm wheels respectively, means for transmitting drive from said power unit to said shafts and thus to said worms and worm wheels for driving said propelling wheels, and means for raising and lowering said frames to alter the position of said propelling wheels in relation to the endless track arrangement to bring either the propelling wheels or the endless track arrangement into propelling position.

Generally speaking, a vehicle according to this invention comprises a buoyant body having a power unit and propelling wheels arranged to be driven by the power unit and to propel the vehicle through water or over land. The buoyancy may be provided by the body itself of the vehicle or by floats connected to the body. In addition to the propelling wheels, an endless track arrangement is provided for the purpose of propelling the vehicle over soft ground and in addition the relative heights of the track and wheels can be adjustable to enable one or the other to effect propulsion over land; the endless track arrangement preferably extends over the major part of the base of the body of the vehicle.

For propulsion in water when the vehicle is floating the wheels can be provided with suitable paddles or blades.

The endless track unit or units is or are mounted underneath the body of the vehicle and preferably extend over the full width of the bottom of the vehicle and preferably also are constructed as a divided track; that is to say in a number of side by side sections. Such endless track units will be driven from the same driving mechanism as are the side wheels and accordingly gearing may be interposed between the shafts driving the wheels and the driving wheels or rollers of the endless track units. This driving transmission is preferably arranged so that one or more endless track units are associated with the driving shaft of one wheel on one side and another unit or units associated with the side wheel on the other side whereby for turning or steering one wheel and its associated endless track unit or units may be driven at one speed in a certain direction whilst the other wheel and its associated endless track unit or units may be driven at a different speed and/or in an opposite direction.

Buoyancy may be provided by floats but instead of employing special floats, the body of the vehicle may be constructed so that it will provide the necessary buoyancy; that is to say, the body is made as a watertight hull adapted to float in water.

To provide the necessary buoyancy the vehicle body may extend in width to the full extent of the wheel track or beyond this, so that the wheels are in effect located in recessed parts of the vehicle body. The wheels themselves may be hollow bodies so that they add to the buoyancy, or alternatively the hollow spaces within the wheels may be used to carry liquid fuel.

It is preferred to connect the axle of the wheels to the body by means of suitable frame work arranged to be raised and lowered by screws and worms or the like, each frame in unison with the other. The frames are fitted with suitable bearings for the wheels, e. g. a number of spaced rollers adapted to run within a ring carried by each wheel, the frame work and its connections with the body structure being such as to enable the wheels to be raised or lowered at will with respect to the body. Thereby the endless track unit or units, mounted underneath the body and preferably extending the full width of the bottom thereof, may be brought into or out of action. This adjustment is capable of being effected from inside the vehicle and, if desired, whilst the vehicle is actually travelling so as to promote the coming into operation of the endless track units, or the withholding of them from operation, according to circumstances in relation to the nature of the ground being traversed. Thus on very soft ground it may be desirable to lower the endless track units by raising the wheels relative to the body, so that the endless track will soon come into operation when the wheels sink into the ground, and slipping will be prevented.

A further advantage of the adjustment of the height of the wheels is that when the vehicle is floating the paddles carried by the wheels, and which operate to propel the vehicle, may be submerged to the extent which will give the best driving power.

The blades or paddles carried by the wheels are preferably mounted in such a way that they are protected when the vehicle is travelling on land, and accordingly they may be accommodated in a recess of angle cross section in the side faces of the wheels.

The drive for the wheels and for the endless track units may be taken from the same driving shaft, emerging from the vehicle body above water level when the vehicle is submerged, through gearing such as chains and sprockets. The driving shaft may comprise a differential so that for steering the vehicle the speed of drive of a wheel and endless track unit or units on one side of the vehicle can be different from the speed of the corresponding wheel and endless track unit or units on the other side of the vehicle. In some cases a small wheel normally bearing on the ground at the tail of the vehicle, may be mounted on a swivel joint so as to be moved as desired to effect steering. This small wheel, when the vehicle is afloat, may be used as a rudder. Provision is made for retracting the small wheel out of contact with the ground when it is not required in use.

For use when the vehicle is afloat, further means of propulsion may be employed, e. g. one or more propeller screws driven by the same motor as drives the wheels and the tracks, or by an independent motor.

The drive to the wheels may be through a differential gear driven by Cardan shafts, splined or having a universal coupling so as to allow for up and down adjustments of the frame.

It is to be understood that this invention is not limited to application to armoured vehicles. The invention is applicable also to vehicles that may be used for industrial purposes and even, on a reduced scale to toy vehicles.

The invention is illustrated in the accompanying drawings in which Figures 1, 2 and 3 are respectively side elevation, plan and transverse sectional elevation on the line III—III Figure 1 of a vehicle and Figures 4, 5 and 6 are detail views of part of the mechanism, Figure 4 being a side elevation, Figure 5 an end elevation, and Figure 6 a plan; Figure 7 is an elevation of a modification.

Referring firstly to Figures 1–6, 1 indicates a boat shaped body which has two relatively large supporting wheels 2 preferably provided with pneumatic tires 3. Each of these wheels which are located in recesses R at each side of the body 1 supports the body through a system comprising a drum 4 fast with the wheel and receiving within its inner periphery a plurality of rollers 5 preferably three in number as shown, the rollers being rotatably carried by a frame 6 on the body 1.

The wheels 2 are arranged to be driven to propel the body 1 from a power unit 7 within the interior of the body 1, the drive being effected from propeller shafts 8 extending on each side of the power unit thence by chain and sprocket gearing 9 to stub shafts 10 having worms 11 meshing with worm wheels 12 on shafts 13 having worms 14 engaging teeth on the drums 4.

The body is provided with one or more propellers 15 driven by the power unit 7 for propelling the body through water and in addition or in substitution for the propellers the wheels 2 themselves may be provided with vanes 16 to act as paddles.

With the parts so far described it will be apparent that if the body 1 is in water and either the propeller 15 or the wheels 2 are rotated, the body will be propelled through the water; if the body 1 is on land, the tires 3 on the wheels will propel the vehicle. The body 1 may be so arranged that its centre of gravity is below the effective supporting axis of the wheels in which case the body will be slung from the supporting wheels and will remain horizontal; in other cases, however, and as shown, the centre of gravity may be above the axis and in this case a supporting wheel or wheels 17 are provided at one end of the body. This wheel 17 is carried by a stem 18 which can be retracted and advanced by an hydraulic ram and cylinder arrangement 19 which can be operated from the power unit 7.

The body 1 of the vehicle is also provided with an endless track arrangement for propelling the body over soft ground. This track is arranged to extend more or less over the complete width of the lower part of the body 1 and it comprises for this purpose a plurality of full length endless track components 20 and (to cover the parts left by the recesses R) short length units 21. These endless track components are driven from the power unit 7 by chain gearing 22. The track 20, 21 by extending across the body 1 serves to protect the bottom of the body whilst the machine is running over rough or broken ground, as well as when it is travelling in water of varying depths; it also eliminates all possibilities of the body of the machine being left "sitting" on a mound or obstacle of any sort.

To enable the vehicle to be steered either when water-borne or when land-borne, drive to the two wheels is effected through clutches 23 either of which can be declutched to drive one wheel only; similarly the various endless track components 20, 21 are driven through clutches in two sets each on one side of the longitudinal centre line of the body so that by de-clutching only one set is driven to steer.

The wheels and tracks are arranged to be relatively adjustable as to height to enable the appropriate drive to be brought into use, depending on whether the tracks 20 are required to be brought into use on soft ground or the wheels 2 on hard ground. For this purpose the tracks are fixed as to their height and the wheels 2 are adjustable, the frames 6 from which the wheels 2 are supported being slidable vertically on rods 24, and the worm 14 being slidable on a spline 25 on the shaft 13. The frames are provided each with a nut 27 engaging a screwed rod 28 arranged to be rotated through worm and wheel gearing 29 from a shaft 30 extending for manipulation to within the body 1.

As is shown in Figure 7, the single wheels 2 can be replaced by tandem wheels 31 journalled in arms 32 extending from a frame 33 corresponding to the frame 6.

In order to lower the center of gravity of the body 1 the central pair of endless track components 20 may be sufficiently spaced to receive the power unit 7 between them, this enabling the unit to be placed in a lower position.

The blades 16 will serve not only to propel the vehicle in water but also enable the wheels to "grip" in soft ground.

The tire 3 of the wheel 2, the wheel blades 16 and the track 20, 21 provide the machine when travelling over very soft ground with a drive which functions at three different ground levels, and the wheels 2 and the track can be run independently or conjointly, the machine is assured of an alternative drive should one of them break down.

The wheel blades 16 and the propeller screw 15 provide the machine when travelling in water with a drive which functions at two different water levels, and as the wheels 2 and the propeller screw 15 can be run independently or conjointly, the machine is assured of an alternative drive should one of them break down.

The wheel 2 and the track drive 20, 21 would be adjusted in such a way that the difference between the levels of their gripping surfaces would vary as required so as to prevent the machine from slipping when running in very soft ground, the adjustment being effected from inside the boat and whilst the machine is actually travelling.

The invention provides an effective and easily manipulated armoured vehicle capable of travelling in water of varying depths, on the surface of water, on hard surfaces, soft or flooded surfaces, even or flat surfaces and on uneven or hilly surfaces.

It is proposed accordingly that the improved vehicle may be used as a means of disembarking troops from ships at sea, for crossing rivers or streams and flooded land, for rapid and safe transport of troops at sea or on land, and as a mechanical means to attack at sea or on land.

What we claim is:

1. An amphibian vehicle comprising in combination a buoyant body, a power unit carried by the body, an endless track arrangement to propel the vehicle over relatively soft ground, means to connect the track to the body at a fixed height, propelling wheels to propel the vehicle over relatively hard ground, means associated with said propelling wheels for propelling said vehicle through water, frames connecting the wheels to the body, a pair of vertical screws journalled on the body, nuts carried by the frames and respectively engaging said screws, means for transmitting drive from said power unit to said screws for raising and lowering said frames, to alter the positions of the wheels in relation to the endless track arrangement to bring either the wheels or the endless track arrangement into propelling position, and means to transmit drive from the power unit to the endless track arrangement and to the propelling wheels.

2. An amphibian vehicle comprising in combination a buoyant body, a power unit carried by the body, an endless track arrangement to propel the vehicle over relatively soft ground, means to connect the track to the body at a fixed height, propelling wheels to propel the vehicle over relatively hard ground, means associated with said propelling wheels for propelling said vehicle through water, frames connecting the wheels to the body, means mounting the frames for vertical movement on said body, worm wheels carried respectively by said propelling wheels, vertically extending splined shafts journalled on said body and having combined rotary and vertical sliding movements relative to said frames respectively, worms spline-connected to said shafts respectively to turn therewith and to slide relatively thereto, said worms meshing with said worm wheels respectively, means for transmitting drive from said power unit to said shafts and thus to said worms and worm wheels for driving said propelling wheels, and means for raising and lowering said frames to alter the position of said propelling wheels in relation to the endless track arrangement to bring either the propelling wheels or the endless track arrangement into propelling position.

GEOFFREY MAXWELL GIBBS.
THOMAS RAWSON TUSTING.